Figure 1:
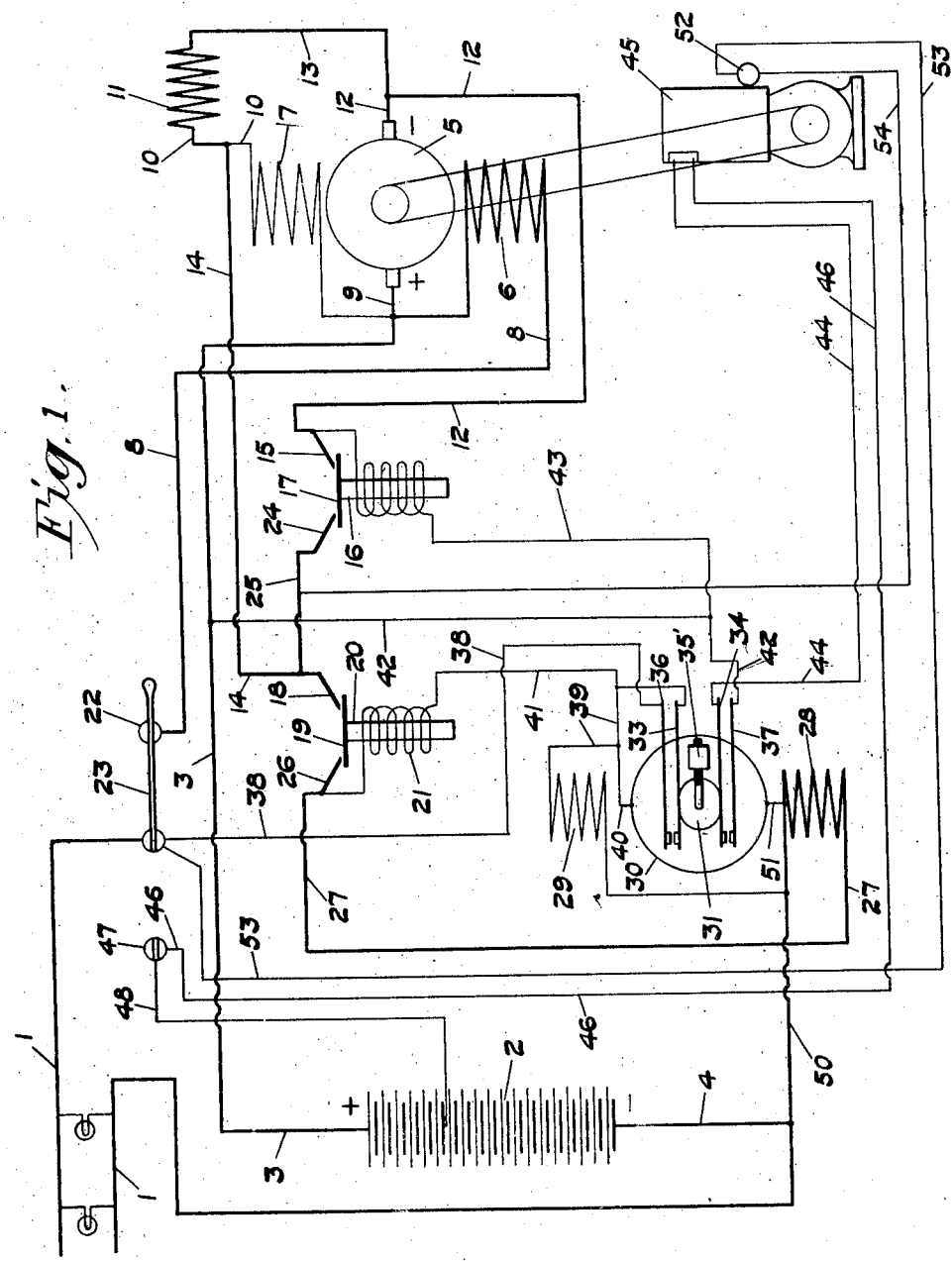

I. T. SWARTZ.
ELECTRIC POWER SYSTEM.
APPLICATION FILED JUNE 23, 1917.

1,348,907.

Patented Aug. 10, 1920.
2 SHEETS—SHEET 1.

WITNESS.
Walter H. Troemel.

INVENTOR
Ira T. Swartz
BY
Brasford & Doolittle
ATTORNEYS

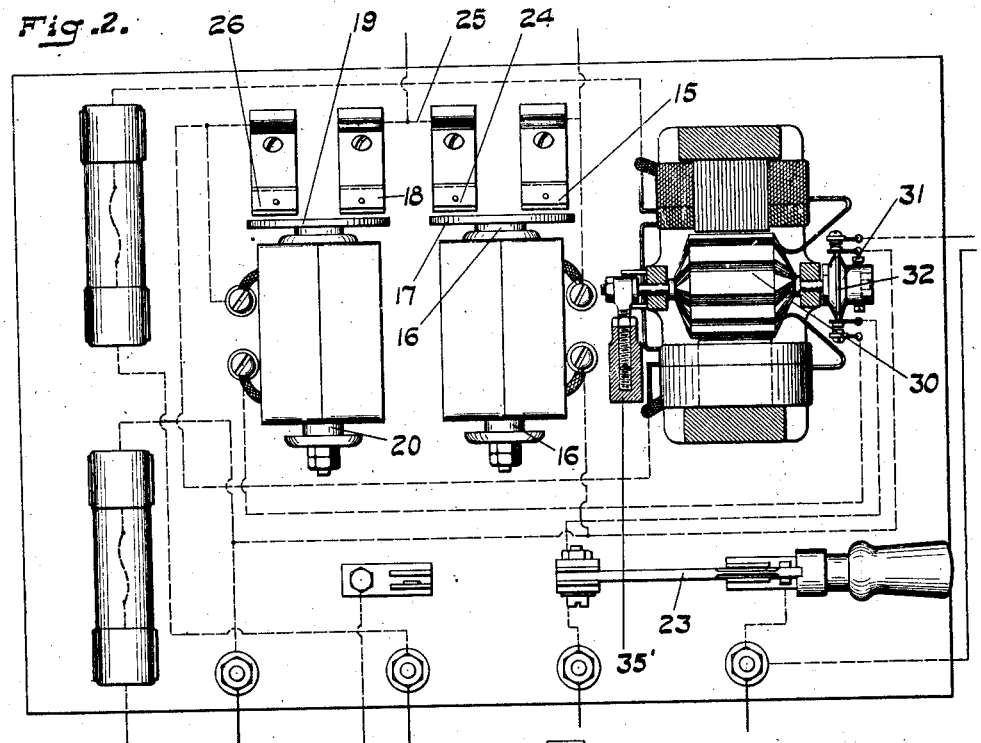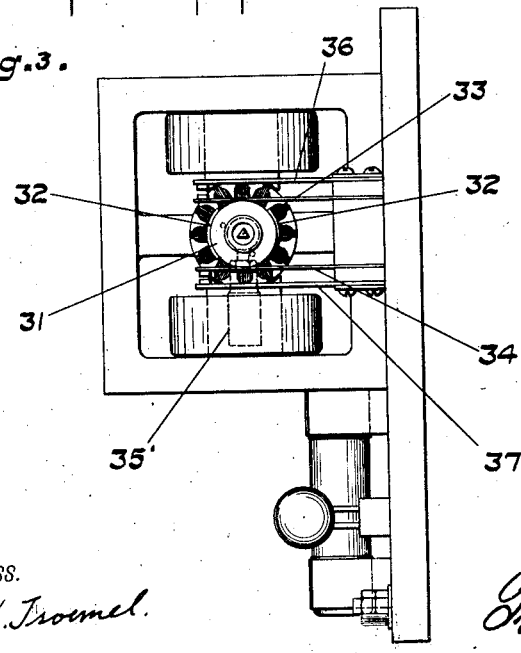

UNITED STATES PATENT OFFICE.

IRA T. SWARTZ, OF INDIANAPOLIS, INDIANA, ASSIGNOR TO SWARTZ ELECTRIC COMPANY, OF INDIANAPOLIS, INDIANA, A CORPORATION OF INDIANA.

ELECTRIC POWER SYSTEM.

1,348,907. Specification of Letters Patent. Patented Aug. 10, 1920.

Application filed June 23, 1917. Serial No. 176,643.

*To all whom it may concern:*

Be it known that I, IRA T. SWARTZ, a citizen of the United States, residing at Indianapolis, Marion county, and State of Indiana, have invented and discovered certain new and useful Improvements in Electric Power Systems, of which the following is a specification.

My invention relates to electric power systems and particularly to systems including a prime mover, such as an internal combustion engine, a dynamo electric machine and a storage battery or equivalent source of electrical energy in which the engine is adapted to be started by the dynamo electric machine and after the engine has become started the said machine becomes a generator to charge the battery or supply the line or both and current is supplied to the line for lighting or other power purposes.

The objects of the invention are to provide in such a system, means whereby the draining of the battery is prevented when the system is not in use, and whereby the circuit through the generator is interrupted when the battery is the sole source of energy, thus also saving the battery, to provide means whereby the starting of the system must be effected manually, to provide means whereby the manually effected starting operation also serves to establish a circuit through an automotic differential master switch, which serves to control the charging of the battery by the generator and which acts to cut off the charging current at a predetermined point in order to prevent overcharging and thus both avoid injury to the battery and also save fuel and to generally improve the construction and operation of systems of this class.

With these objects in view, my invention is embodied in preferable form in the arrangement hereinafter described and illustrated in the accompanying drawings.

In these drawings, Figure 1 is a diagrammatic view of the circuit of the system; Fig. 2, a front view in elevation of the switch board employed and which embodies the essential operating features of the system, and Fig. 3, an end view of the master switch.

The invention is shown as applied to a system having a line to which current is supplied for lighting or power purposes and having a storage battery, and a generator set consisting of a dynamo electric machine operable as a motor or a generator and a prime mover for driving the same and which prime mover is preferably an internal combustion engine, a master switch and auxiliary switches, which master switch is adapted to be manually controlled to automatically start the prime mover through the dynamo electric machine and is thereafter automatically and electrically operated to cut out the generator set when the current demand falls below a predetermined point.

Referring to the drawings, 1 indicates the load line, 2 the battery, 3 the positive battery lead, 4 the negative battery lead. The lead 3 connects with the positive side of armature 5 of the dynamo electric machine, of which 6 is a series winding, as is usual in compound wound generators in order to provide voltage regulation and 7 a shunt winding in the circuits 8—9—3 and 3—9—10 respectively. The series winding 11 is in the circuit 12—13—14 and serves to provide resistance and increase the torque when starting the dynamo electric machine as a motor, making the dynamo electric machine a compound motor at the time of starting. The line 12 leads from the negative side of the armature to a fixed contact 15 above an armature 16 carrying a movable contact 17 of a shunt wound solenoid generator switch. The line 14 leads to a fixed contact 18 with which contact is adapted to be made by a movable member 19 carried by an armature 20 of a solenoid switch having a shunt winding 21. The line 8 through the series field winding of the dynamo electric machine leads to the terminal 22 controlled by a manually operated single pole double throw switch 23. This switch is shown as thrown to what is called the running side, that is, in the position in which the line current is supplied from the generator, although the latter also serves to supply the battery if the latter is not sufficiently charged.

A fixed contact 24 of the generator solenoid switch is connected by conductor 25 with the line 14 and hence with contact 18 of the motor solenoid switch. A contact 26 corresponding to contact 18 is connected to the line 27 in the circuit of the winding of the motor switch and this line leads to a differential series winding 28 of a master switch which is in the form of a compound wound oscillating motor, including the shunt winding 29. The armature 30 of this motor carries at the outer end of its shaft, an oscillating non-conducting cam member 31 having metallic, insulated cam portions 32 which are adapted to press against yielding spring contacts 33 and 34 when the cam member 31 is turned by hand by means of a handle.

On the inner end of the armature shaft is a threaded arm at right angles thereto, on which arm is mounted an adjustable weight 35' which tends to hold the cam member in contact separating position and which opposes a force of known value to the series winding and corresponds to a predetermined value of current through the series winding which in turn is dependent upon the current demand on the generator, due to the demand in the line or in the battery. The shunt winding 29 is of a known and constant electromotive force value and opposes its force against that produced by a predetermined current value through the series winding. The weight is adjustable on its rod to enable the leverage on the armature shaft to be changed and such weight therefore constitutes a calibrating member of the constant switch control elements composed of said weight and the shunt winding. The switch thus has two constants opposing a variable.

The contacts 33 and 34 are adapted to respectively make contact with fixed spring contact members 36 and 37. From the fixed contact 36 a line 38 leads to the middle pole of the switch 23 and from the movable contact 33 a line 39 leads to the shunt winding of the field of the oscillating motor constituting the master switch, and this contact is also connected to the armature by line 40 and to the shunt winding of the motor solenoid switch by line 41. The fixed contact 37 of the other pair of contacts controlled by the cam member on the armature shaft is connected by line 42 to lead 3. The line 43 connects the winding of the generator solenoid switch with the line 42 and the lead 3. The movable contact 34 controlled by the master switch is connected to line 44 forming part of the ignition circuit for the internal combustion engine 45, said circuit being completed by line 46 leading to the pole 47 of the single pole double throw switch 23. Line 48 leads from the pole of the single pole double throw switch back to an intermediate cell of the storage battery 2.

The shunt winding 29 of the master switch and the differential series winding 28 thereof connect by lead 50 with the negative lead 4 of the battery 2. The armature 30 is also connected by the line 51 with the lead 50.

A voltage governor 52 adapted to control the throttle valve, or other fuel governing or speed controlling mechanism of the internal combustion engine in order to regulate the voltage at the generator terminals, is mounted adjacent said engine and is connected by line 53 with the middle pole of the switch 23 and by line 54 with the line 25 connecting fixed contacts 18 and 24. This governor is subject to and controlled by variations in voltage in the load line and is adapted to regulate the speed of the engine accordingly so as to maintain a constant voltage at the generator terminals.

Tracing the circuit and describing the operation of the system the same are as follows:—

To connect the load line with the plant, the switch 23 is thrown to connect its middle pole with either the pole 22 or pole 47, according to whether the battery is sufficiently charged or not; if the battery is not sufficiently charged the switch is thrown on the charging side, namely, in connection with pole 47. In the drawing the switch is shown as connected to the running side, namely, with pole 22. When thrown to either side the switch merely establishes line connections and does not serve to start the generator or complete the generator circuit, the latter line being still broken at the motor and generator solenoid switch contacts. To start the plant the operator turns the handle of the shaft of the armature 30 so as to rotate the cam member 31 until the raised cam portions 32 on the periphery thereof are carried against the inner spring contacts 33 and 34 forcing such spring contacts against the fixed spring contacts 36 and 37 which action closes the branch circuit of the ignition circuit, the shunt of the master switch, the armature thereof, and the motor solenoid switch. The cam member is held by hand in contact closing position until the engine has become properly started.

The circuit is then as follows:—

From the battery 2 through the lead 3 through the series winding 6 of the dynamo electric machine lead 8 to the pole 22 through the central portion of the switch 23 through line 38 to fixed contact 36 through movable contact 33 through the shunt winding of the master switch 29 and back to the battery through the lead 50 and also from contact 33 through line 40 to the armature 30, and through the line 51 from the armature to the circuit; from contact 33, by line 41 to the winding of the motor solenoid switch, to the contact 26 through lead 27 to the differential series winding 28 of the master switch and back to lead 50 of the battery, whereupon the motor solenoid switch will be energized and core 20 lifted to carry the contact 19 into engagement with the fixed contacts 26 and 18. The closing of these contacts allows current to flow from battery 2 through lead 3 and lead 9 into armature 5 thence out through lead 12 through lead 13 and starting series 11 to lead 14 to stationary contact 18 of the motor solenoid switch through movable contact 19 to stationary contact 26 of the motor solenoid switch and through lead 27 to differential series 28 of the master switch and to lead 50, thence through lead 4 to battery 2, thus completing the armature circuit of the motor. At the same time current flows through lead 3, shunt winding 7 of dynamo electric machine, through lead 10 to lead 14, and thence over the same path as just described to storage battery 2. This causes the armature 5 to rotate and the dynamo electric machine operates as a compound wound motor rotating the shaft of the internal combustion engine. At the same time that the contacts 33 and 36 are closed the contacts 34 and 37 are likewise closed establishing the ignition circuit through the lines 44 and 46. When the engine attains its normal speed it overruns the motor and drives the same, causing it to operate as a generator, whereupon, owing to the increase in voltage the solenoid generator switch will be excited through lines 9—3—42 and 43, thus lifting the core 16 and carrying the contact 17 thereof into engagment with the contacts 24 and 15, which action short circuits the starting series field winding 11.

The windings of the coils of the motor solenoid and generator solenoid are composed of different sized wires so that the motor solenoid will be responsive to a predetermined lower voltage than the generator solenoid so that the latter will not be energized when the motor solenoid is excited, nor until the generator voltage has built up to a higher value of predetermined quantity.

With the dynamo electric machine now acting as a generator the path of the current will be reversed to that previously described and the current will flow into the battery from the generator, charging the former.

Returning to the action of the master switch, which has been actuated by hand, current is now flowing through both the armature and shunt windings and also through the differential series winding. The action of the current through the shunt windings as well as that of the weight 35' is to return the armature and its shaft, and consequently the cam 31, mounted on the shaft, to the off position, but the action of current flowing through the differential series, if of sufficient magnitude, overcomes that of the weight and shunt winding and tends to rotate the armature and consequently cam 31 in the opposite direction, thereby keeping the contacts 33 and 36 and also 34 and 37 closed until the current demand on the generator, and consequently the amount of current flowing through the differential series is reduced to a predetermined value at which time the action of the shunt winding combined with that of the weight will overcome the action of the differential series winding and the armature, and consequently cam 31 will be rotated to the off position, and contacts 34 and 37 will separate, thus breaking the ignition circuit to the prime mover 45. Also the contacts 33 and 36 will separate and the circuits through the motor solenoid switch winding will be broken and the prime mover will cease to operate for want of ignition. Likewise, the motor solenoid core 20 will disengage the movable contact 19 from stationary contacts 18 and 26 thereby breaking the circuit through the motor or generator. Current will now flow from the battery in the reverse direction, whereupon energy is supplied to the load lines 1 from storage battery 2 through lead 3, series winding 6, lead 8 to pole 22 of the switch 23 and through lead 4 to the opposite side of the line.

When the switch 23 is thrown in the position of pole 47, or charging side, which is only when generator is in operation, energy for load lines 1 is taken from negative battery lead 4, and an intermediate point on the battery through lead 48 and switch 23 to supply the necessary load energy at the normal voltage of the load lines 1, this intermediate point being determined by the type of battery used in connection with the system. Also ignition is obtained at the proper voltage by utilizing the required number of cells between the positive side of the storage battery 2 and the intermediate point connected to lead 48.

Some of the features of the system herein shown and described do not *per se*, constitute part of my invention, such as the master switch broadly, when considered as an automatically acting element, and also the combination therewith of the auxiliary motor and generator switches, such features being covered by the application of Edward B. Reese, Serial Number, 114,907, assignee to the Swartz Electric Company. Also the particular construction of the switch operating cam member herein shown is not claimed by me a part of my invention, the same being covered by an application filed June 23, 1917, Serial No. 176,551 of Roy Clore assignee to the Swartz Electric Company and filed of even date herewith.

With a system as above described it is necessary to start the same in operation by manual actuation of the master switch which is located adjacent the prime mover, thus insuring that such attention will be given to the prime mover by the operator as will assure the starting thereof, thereby avoiding drainage of the battery in possibly useless attempts to start the prime mover through the dynamo electric machine. This arrangement also avoids the loss of current through the master switch when the dynamo electric machine is cut off, thus preventing the drain on the battery ordinarily necessary in systems which are automatically started in operation by the creation of a current demand in the line.

At the same time the system preserves the advantageous function of automatically cutting out the dynamo electric machine set including the prime mover and dynamo electric machine whenever the current demand on the dynamo electric machine falls below a predetermined point, thus saving fuel and preventing overcharge of the battery. The electro-magnetic master switch must be initially manually actuated to close the circuits.

Having thus described my invention, what I claim is:—

1. In an electric power system, in combination with a plurality of sources of electrical energy comprising a dynamo electric machine, a prime mover therefor, a battery, a load line, a main line switch therefor an electro-magnetic master switch, means for manually actuating the same to start the operation of the dynamo electric machine and having means for electrically and automatically cutting out one of the sources of electrical energy when the current demand falls below a predetermined point.

2. In an electric power system, in combination with a generator set including a prime mover and a dynamo electric machine, a storage battery, a switch having armature and shunt and differential series windings controlling the motor and generator circuits, said switch including means operating to normally hold the switch open, and means whereby the switch must be manually closed against the force of said first mentioned means to initially complete the motor circuit and ignition circuit therethrough, said switch being automatically opened by a predetermined decrease in the current demand on the dynamo electric machine to stop said machine through the overbalancing of the series winding by said first mentioned means.

3. In an electric power system, in combination with a storage battery, a dynamo electric machine, a prime mover, a single switch having rotatable armature and shunt and differential series windings for controlling the ignition and motor circuits, means to manually close the switch and means to prevent flow of current through the switch when the dynamo electric machine is out of operation.

4. In an electric power system, in combination with a storage battery, a dynamo electric machine, a prime mover, a compound wound electro-magnetic switch for controlling the ignition and motor circuits, said switch having its contacts normally open, means for manually closing said contacts simultaneously, and means for automatically breaking said contacts by a variation in the electro-motive force through the switch produced by a decrease in the current demand on the dynamo electric machine.

5. In an electric power system, in combination with a load line, a storage battery across the line, a dynamo electric machine across the line, a prime mover, ignition and motor circuits, an electro-magnetic switch in the battery line for controlling said circuits, the contacts of said switch being normally open, means for manually closing said contacts, means for electrically and automatically opening the contacts upon a predetermined decrease in current supplied by the dynamo electric machine to interrupt the circuit from battery to generator and means comprising a switch for maintaining the battery in circuit with the load line after such interruption.

6. In an electric power system, in combination with a prime mover, a dynamo electric machine, a starting series winding therefor, a battery, a power circuit, an oscillating motor switch having a shunt winding and a differential series winding and including a switch controlling element, said switch being subject to pull in opposite directions by said controlling element and by the opposing counter electro-motive force through said series winding, means for manually actuating said switch against the force of said element, a shunt wound motor switch across the dynamo electric machine circuit and adapted to effect the starting of the latter through the starting series winding to drive the prime mover, a generator switch operable to cut out the starting series winding of the generator by the increased voltage from the dynamo electric machine when the same operates as a generator, said motor and generator switches being controlled by the master switch, said element of the master switch being operable to cut out the dynamo electric machine when the force thereof overbalances the force of the series winding upon a predetermined decrease in current demand.

7. In an electric power system, in combination with a prime mover, a dynamo electric machine operable as a motor or as a generator, a battery, a power circuit, a master switch including a differential winding, a shunt winding of a constant electro-motive force value, and opposing the series winding, the master switch contacts being normally open, means for manually actuating said contacts, means controlled by said master switch for establishing the ignition and motor starting circuits, means for short circuiting the starting circuit upon a predetermined rise in the dynamo electric machine voltage, said master switch being automatically operable through the shunt and series windings upon a decrease in current demand on the dynamo electric machine to interrupt the circuit through the dynamo electric machine and battery, and dynamo electric machine and line.

8. In an electric power system, in combination with a plurality of sources of electrical energy, a power circuit, an electromagnetic master switch including a differential series winding, a shunt winding comprising an electric switch control element and a mechanical switch control member, which member is operable to add its force to that of the shunt winding, and means for controlling the circuits of said sources of energy by said switch.

9. In an electric power system, in combination with a plurality of sources of electrical energy, a power circuit, a master switch including a differential series winding, an opposed shunt winding, and a calibrating adjustable mechanical element operable with the force of the shunt winding, and means for circuit control by said switch.

10. In an electric power system, in combination with a prime mover, a dynamo electric machine, a battery, a load line, a master switch including a differential series winding, an opposed shunt winding, a calibrating weight element, means controlled by the switch for starting the dynamo electric machine and prime mover, means for manually closing said switch, said switch being opened upon a predetermined decrease in current demand on the dynamo electric machine by the overbalancing of the series winding by said shunt and weight elements.

11. In an electric power system, in combination with a plurality of sources of electrical energy, a switch including a differential series winding, a shunt winding of constant electro-motive force value and a calibrating weight member, the weight of which acts in the same direction on the switch as the shunt winding, means for controlling the circuits of said sources of energy from said switch, manually operated means for closing the switch contacts and said switch being operable automatically upon a decrease in current demand on one of said sources to interrupt the circuit therefrom.

12. In an electric power system, in combination with a dynamo electric machine, a storage battery, an electro-magnetic master switch, an auxiliary electro-magnetic motor and ignition circuit establishing switch, an auxiliary electro-magnetic generator controlled switch, said auxiliary switches being controlled in excitation by the actuation of the master switch, a series winding in series with the armature and in the auxiliary motor switch circuit, and operable as a starting resistance for the dynamo electric machine, when in the motor circuit, said starting series winding being automatically short circuited by the dynamo electric machine controlled switch upon the excitation thereof when the dynamo electric machine operates as a generator.

In witness whereof I have hereunto set my hand and seal at Indianapolis, Indiana, this 18th day of June, A. D. nineteen hundred and seventeen.

IRA T. SWARTZ. [L. S.]

Witnesses:
H. P. DOOLITTLE,
M. L. SHULER.